United States Patent

[11] 3,575,095

[72] Inventor Ludwig J. Keck
 Boulder, Colo.
[21] Appl. No. 767,711
[22] Filed Oct. 15, 1968
[45] Patented Apr. 13, 1971
[73] Assignee Honeywell Inc.
 Minneapolis, Minn.

[54] OPTICAL APPARATUS
 5 Claims, 3 Drawing Figs.
[52] U.S. Cl. .................................................. 95/10,
 95/42, 352/218, 352/225
[51] Int. Cl. ...................................................... G01j 1/42,
 G03b 19/12
[50] Field of Search .......................................... 95/42, 10
 (C); 356/215, 218, 219, 225

[56] References Cited
 UNITED STATES PATENTS
 3,100,429 8/1963 Koch ............................ 356/218X
 3,282,178 11/1966 Nelson ......................... 356/218X
 3,347,143 10/1967 Jacobs........................... 95/42
 3,464,339 9/1969 Trankner...................... 95/42
 3,478,663 11/1969 Tsuruoka et al.............. 95/42

OTHER REFERENCES
 Goldberg, German Application No. 1,208,621, Printed Jan. 5, 1966 (Kl 57a— 9/03), 95— 42.

*Primary Examiner*—John M. Horan
*Assistant Examiner*—Joseph F. Peters, Jr.
*Attorneys*—Arthur H. Swanson and Lockwood D. Burton

ABSTRACT: A camera is provided with a behind-the-lens light value metering device. The metering device includes a photocell mounted behind a collector lens so as to be sensitive to only the value of light radiating from a predetermined smaller area within the object area to be photographed. A selectively positionable optical element is included in the metering device for dispersing light radiating from the object area, thereby to render the photocell sensitive to dispersed light radiating from the entire object area.

Patented April 13, 1971

3,575,095

INVENTOR.
LUDWIG J. KECK

BY Lockwood D. Burton

ATTORNEY.

OPTICAL APPARATUS

The invention relates to cameras and in particular to cameras having behind-the-lens light value metering means.

It is known in connection with such cameras to locate light value metering means for film-exposure-determining purposes behind the camera lens, thereby to meter only that light which will fall on the film area at the instant of exposure. Such metering means are generally arranged to be responsive to light radiating from the total object area of the camera, and make what is called an average or integrated exposure determination. It is known further to arrange light value metering means to be responsive to only light radiating from a predetermined defined smaller portion or spot in the total object area. Such latter method of light metering is commonly called spot metering and makes an exposure determination on the basis of light radiating from the predetermined portion of the object area.

Cameras utilizing spot metering are particularly useful in applications in which only a portion of the object or subject matter of the photograph is of primary interest. By centering the light-responsive spot of such cameras on that portion of the object of primary interest, an accurate exposure determination may be made for that spot regardless of the relative brightness or darkness of the remaining part of the object area. In numerous situations, however, no specific portion of the photographic subject matter is of primary interest, and an exposure determination is desired which reflects the average value of brightness of the entire object area. In these latter situations, a photographer using a camera having only spot metering means is handicapped since in order to achieve such an average exposure determination, he must correctly position the light-responsive spot on a point representative of average brightness of the total object area. Alternatively, he may take spot readings of several representative portions of the area to be photographed and then mechanically or mentally average these readings. Obviously both of these techniques leave much to be desired, since the accuracy of an average exposure determination made by either technique will rest ultimately on a particular photographer's skill. On the other hand, if a photographer uses a camera equipped only to make integrated exposure determinations, he will operate under the handicap that he will not be properly prepared to make spot exposure determinations in those situations which so demand.

It is accordingly an object of the present invention to provide an improved camera of increased versatility characterized by its compact unitary structure and having behind-the-lens light value metering means which may be selectively operated to make integrated exposure determinations or, alternatively, spot exposure determinations.

In accomplishing these and other objects, there has been provided in accordance with the present invention, a single-lens-reflex camera having behind-the-lens light-metering means. The metering means includes a collector lens which collects light radiating from the object area to be photographed. Mounted behind the collector lens is a photocell. The photocell is positioned to receive only that portion of the collected light which radiates from a predetermined smaller area or spot in the center of the object area; thereby a spot exposure reading is provided. Optical means are included which may be selectively positioned in front of the collector lens to disperse light radiating from the object area. With the optical means so positioned, the photocell is rendered sensitive to dispersed light radiating from the entire object area; thereby an integrated exposure reading is provided. An electrical meter is connected across the photocell to indicate the value of light being sensed at any instant. Thus, an improved camera has been provided which may be used to selectively make integrated or spot exposure determinations.

A better understanding of the invention may be had from the following detailed description when read in connection with the accompanying drawings in which.

Figure 1:
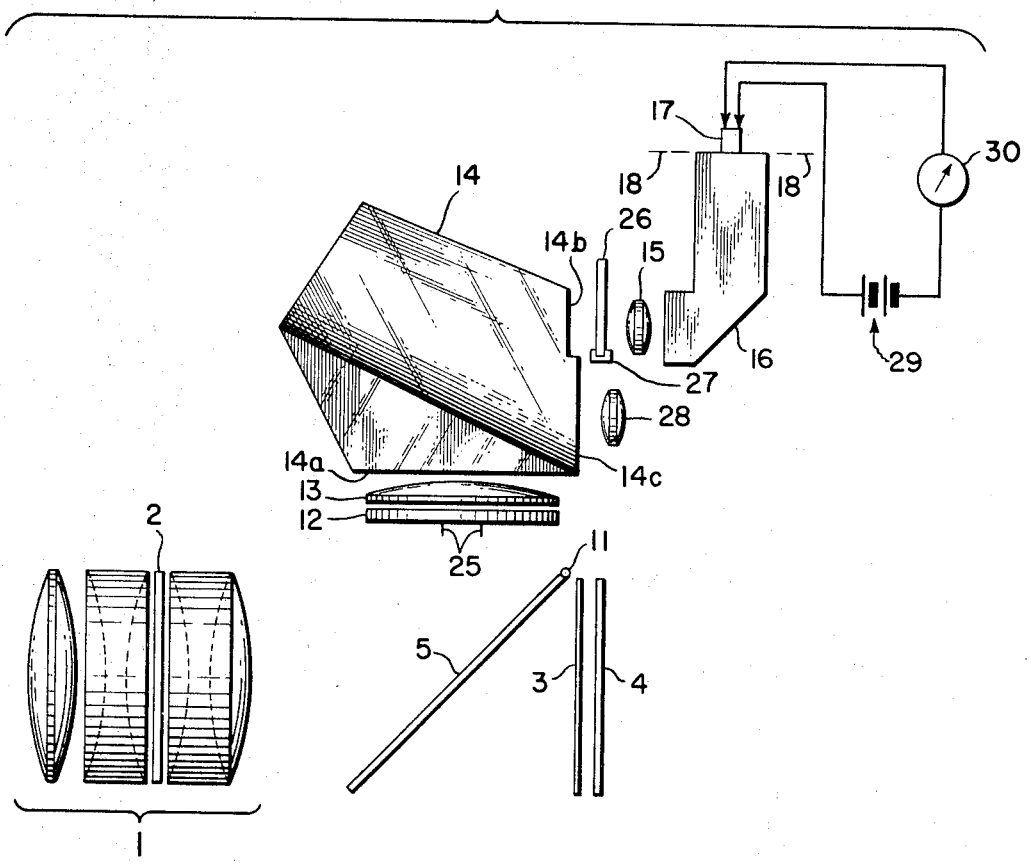
FIG. 1 is, in part, a vertical view and, in part, a schematic view of a camera according to the present invention.

Referring to FIG. 1 in more detail, there is shown the basic elements of a single-lens-reflex camera without a housing. At the front of the camera, there is shown a typical object lens 1 with a conventional between the elements adjustable diaphragm 2. In the rear of the camera, there is shown a shutter 3 and film 4. Located between the lens 1 and the shutter 3 is a tiltable mirror 5 which pivots about a pivot point 11. The mirror 5 in its reflecting position, as shown in FIG. 1, makes an angle of substantially 45° with the vertical and reflects light entering through the lens 1 upward onto a transparent focusing screen 12, whereat an image of the object area intended to be photographed is formed. Light from the image on the screen 12 radiates upward through the condenser lens 13 into the face 14a of an image-erecting viewing prism 14. The prism 14 is of the "roof pentaprism" variety and reflects light entering the face 14a to prism faces 14b and 14c.

Positioned behind the face 14b is light value metering means comprised of a collector lens 15, a prism- or light-directing means 16, and a photocell or light value sensing means 17. The lens 15 is positioned behind the face 14b to receive and collect viewing prism reflected light radiating from the object area image on the focusing screen 12. Light collected by the lens 15 is directed by the prism 16 to form an image of the object area in an imaginery plane 18. The photocell 17 is positioned adjacent to the prism 16 with its light-receiving area located substantially in the imaginery plane 18. The light-receiving area of the photocell 17 is appropriately sized to occupy that area in the plane 18 which receives light radiating from the portion of the object area corresponding to a circular spot 25 on the focusing screen 12. The spot 25 is located substantially in the center of the screen 12 and its boundary is etched or marked thereon so as to be visible. The dimension of the spot 25 is indicated schematically in FIG. 1 by the short marks labeled 25 which extend from the screen 12.

Figure 2:
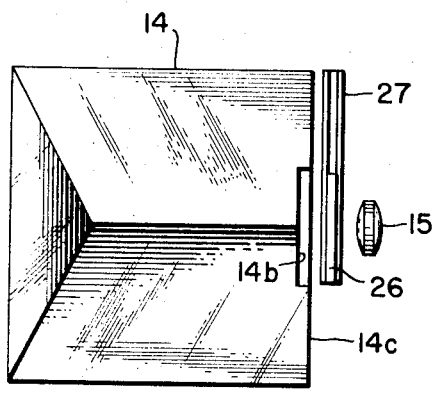
FIG. 2 is a top view of part of the elements appearing in FIG. 1 showing the camera in its integrated light-metering mode of operation.

Also included in the light value metering means in the exemplary camera is an optical element 26 for dispersing light, along with positioning means for selectively positioning the element 26 in the path of light radiating from the object area. The optical element 26 may be ground glass, opal glass or a prismatic element specifically shaped to disperse light. The positioning means consists of a guide 27 in which the element 26 is mounted so as to be manually slidable. The guide 27 is mounted in the exemplary camera so that the element 26 may be selectively slid into a position in front of the collector lens 15, i.e. between the prism face 14b and the lens 15, as shown in FIG. 2. With the element 26 so positioned, light radiating from the object area and collected by the lens 15 is dispersed, and the photocell 17 is consequently rendered sensitive to dispersed light radiating from the entire object area. Thus, the exemplary camera may be said to be in its integrated light-metering mode of operating since the photocell 17 is responsive to the value of dispersed light radiating from the entire object area.

Figure 3:
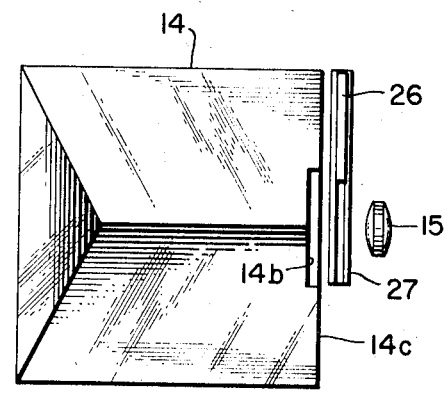
FIG. 3 is a top view of part of the elements appearing in FIG. 1 showing the camera in its spotlight-metering mode of operation.

Alternatively, the optical element 26 may be slid to one side of the lens 15, as shown in FIG. 3, thereby to not disperse light collected by the lens 15. The photocell 17 then is responsive to light radiating from the portion of the object area circumscribed by the spot 25, and the exemplary camera may be said to be in its spotlight-metering mode of operation.

It is noted that while in the exemplary camera a guide is used for positioning the light-dispersing optical element, other conventional positioning means could be employed in the present invention. Further, the guide or positioning means used in an exemplary camera could be so mounted that the light-dispersing optical element would be selectively positionable behind the collector lens, i.e. between the collector lens and the light value sensing means, rather than in front of the collector lens. An integrated exposure reading would still be provided with the light-dispersing optical element in position behind the collector lens since light collected by the collector lens would be again dispersed by the optical element, and the light value sensing means would be sensitive to the value of dispersed light radiating from the entire object area.

Referring again to FIG. 1, an eyepiece or viewing lens 28 is positioned behind the center of the prism face 14c. The eyepiece 28 enables a photographer to view the object area to be photographed, as represented by the image formed on the screen 12, and to identify the portion of the object area circumscribed by the spot 25 should a spot exposure determination be desired.

Concerning the electrical aspect of the exemplary camera, one terminal of the photocell 17 is connected to the positive terminal of a battery 29. The negative terminal of the battery 29, in turn, is connected through a current meter 30 to the other terminal of the photocell 17. The photocell 17 used in the exemplary camera has a photoelectric resistive characteristic wherein the resistance of the photocell varies inversely with the value of light sensed. Therefore, since the voltage of the battery 29 remains substantially constant, the magnitude of current flowing through the meter 30 is proportional to and indicative of the value of light falling on the light-sensitive area of the photocell 17.

While in the exemplary camera, a cadmium sulfide photocell element having variable resistance characteristic is used in combination with a battery and current meter, a voltaic light value sensing means such as a photoconductive selenium element could be similarly employed in combination with a current meter. The voltaic light value sensing means would generate current in proportion to the value of light sensed and would eliminate the need for a battery.

Summarizing, it is hereinbefore established that the object area viewed by the camera object lens 1 is imaged on the focusing screen 12 and may be viewed by a photographer through the eyepiece 28. Therefore, the photographer is able to determine the object to be photographed and may position the variable spot 25 on the portion of the object of primary interest, if a spot exposure determination is desired. Depending on whether an integrated or spot exposure determination is to be made, the optical element 26, respectively, may or may not be selectively positioned in front of the collector lens 15. The exposure determination selected is then automatically indicated by the reading on the current meter 30. The exposure setting thus determined may be used to set the proper relationship between the opening of the diaphragm 2 and the speed of the shutter 3. A photograph may then be taken by actuating conventional means, not shown, which will first pivot the mirror 5 upward out of the light path between the lens 1 and the shutter 3, thereby exposing the film 4.

Thus, there has been provided, in accordance with the present invention, a single-lens-reflex camera having a compact and unitary construction with behind-the-lens light value metering means, which light-metering aspects of the exemplary camera may be selectively operated in a spotlight-metering mode or an integrated light-metering mode. It is apparent that the versatility provided by the option of selective spot or integrated light value metering greatly enhances the utility of such a camera in the hands of a photographic artist or even in the hands of an informed novice.

The embodiment of the invention in which an exclusive property or privilege is claimed are defined as follows:

I claim:

1. In a camera having an object lens through which an object area is viewed, light value metering means positioned in behind-the-lens relationship to said object lens, said light value metering means comprising:
   a collector lens, said collector lens being positioned to collect light radiating from said object area;
   light value sensing means, said light value sensing means being positioned behind said collector lens to be responsive to only the portion of light collected by said collector lens which radiates from a predetermined smaller area within said object area;
   an optical element for dispersing light;
   positioning means selectively operable for positioning said optical element between said object lens and said light value sensing means whereby to disperse light radiating from said object area and render said light value sensing means responsive to said dispersed light; and
   light value indicating means connected to said light value sensing means.

2. The invention recited in claim 1 wherein said positioning means is selectively operable for positioning said optical element between said object lens and said collector lens.

3. The invention recited in claim 1 wherein said positioning means is selectively operable for positioning said optical element between said collector lens and said light value sensing means.

4. The invention recited in claim 1 wherein there is positioned between said object lens and said light value metering means:
   a focusing screen;
   a mirror positionable for reflecting light projected by said object lens onto said focusing screen to form an image of said object area thereon; and
   a viewing prism onto which light from said image is radiated, said viewing prism being positioned to direct light radiated from said image onto said light value metering means.

5. The invention recited in claim 4 including light-directing means positioned between said collector lens and said light value sensing means, said light-directing means being positioned to direct light from said collector lens to said light value sensing means.